United States Patent
Kalkunte et al.

(10) Patent No.: US 10,175,945 B2
(45) Date of Patent: Jan. 8, 2019

(54) METHODS AND SYSTEMS FOR IMPROVING CORRELATION

(71) Applicant: NextNav, LLC, Sunnyvale, CA (US)

(72) Inventors: Vikram V. Kalkunte, Santa Clara, CA (US); Subramanian S. Meiyappan, San Jose, CA (US)

(73) Assignee: NextNav, LLC, Sunnyvale, CA (US)

(*) Notice: Subject to any disclaimer, the term of this patent is extended or adjusted under 35 U.S.C. 154(b) by 0 days.

(21) Appl. No.: 15/491,653

(22) Filed: Apr. 19, 2017

(65) Prior Publication Data
US 2017/0366219 A1    Dec. 21, 2017

Related U.S. Application Data

(60) Provisional application No. 62/351,825, filed on Jun. 17, 2016.

(51) Int. Cl.
*H04B 1/00* (2006.01)
*G06F 7/52* (2006.01)
*H04B 1/7075* (2011.01)

(52) U.S. Cl.
CPC ........... *G06F 7/52* (2013.01); *H04B 1/70752* (2013.01)

(58) Field of Classification Search
CPC .......... H04B 1/709; H04B 1/707; H04B 1/69; H04B 1/70752; H04B 1/708; H04L 7/042; H04L 27/2662

USPC ...... 375/150, 130, 343, 146, 148; 455/552.1
See application file for complete search history.

(56) References Cited

U.S. PATENT DOCUMENTS

| | | | |
|---|---|---|---|
| 2003/0112856 A1* | 6/2003 | Challa | H04B 1/7077 375/148 |
| 2005/0254560 A1* | 11/2005 | Huang | G01S 19/30 375/150 |
| 2010/0220706 A1* | 9/2010 | Heidari | G06F 15/7867 370/342 |
| 2011/0007783 A1* | 1/2011 | Weill | G01S 19/254 375/150 |
| 2011/0122926 A1* | 5/2011 | Myong | H04B 1/707 375/146 |
| 2013/0136155 A1* | 5/2013 | Weill | G01S 19/24 375/142 |
| 2014/0254636 A1* | 9/2014 | Stephens | H04B 1/709 375/150 |

* cited by examiner

*Primary Examiner* — Khai Tran
(74) *Attorney, Agent, or Firm* — Kyle Pendergrass (57) ABSTRACT

Systems and methods for improving correlation. In at least one system and method, a signal is received and divided into a plurality of slices. Each of the slices is divided into a plurality of sub-slices. A plurality of chips of a PN code are generated, and sub-slice correlation results are generated in parallel. Summation of the sub-slice correlation results generates a slice correlation results, and the accumulated slice correlation results provide a correlation result.

10 Claims, 11 Drawing Sheets

| System | Chipping Rate | PN sequence Length | Signal BW |
|---|---|---|---|
| GPS L1 C/A | 1.023 Mc/s | 1023 | ~2 MHz |
| GLONASS L1 C/A | 511 Mc/s | 511 | ~1 MHz |
| Beidou L1 B1I | 2.046 Mc/s | 2046 | ~4 MHz |
| MBS IDB (alternating) | 1.023 Mc/s 2.5575 Mc/s | 1023 2047 | 2.046 MHz 5.115 MHz |
| MBS IDB-A (alternating) | 1.023 Mc/s 2.046 Mc/s | 1023 2046 | 2.046 MHz 5.115 MHz |

FIG. 13

METHODS AND SYSTEMS FOR IMPROVING CORRELATION

FIELD

This disclosure relates to wireless communications, and more particularly, to methods and systems for improving correlation.

BACKGROUND

Direct-sequence spread spectrum (DSSS) receivers can accurately compute their geographical position by receiving and analyzing the time of arrival (TOA) of different signals transmitted from reference transmitters. Signals transmitted by DSSS systems intentionally consume more signal bandwidth than what is actually required to transmit a data signal. One process of intentionally increasing the signal bandwidth is called "spreading". Spreading a data signal over a greater bandwidth for transmission will result in a transmitted signal that has increased immunity to interference and jamming, prevents interception by unauthorized receivers (e.g., eavesdropping), and allows for transmission channel sharing.

One way of achieving spreading is by using DSSS modulation. In one implementation of DSSS modulation, a data signal is modulated with a bit sequence known as a pseudo-noise (PN) code. The PN code consists of a series of chips (e.g., pulses) having a shorter duration than the pulse duration of the data signal. By modulating the data signal with the series of pulses, a transmission signal is generated that has a bandwidth which is larger than the bandwidth of the data signal.

After a receiver receives the transmitted signal, the receiver must "de-spread" that signal in order to extract its data. One way to de-spread the signal is by using a correlator module to convolve samples of the signal with chips of a locally generated PN code. The result, known as a correlator function (CF), is read by a processor module of the receiver for further processing to compute the signal's TOA.

DSSS-based receivers have one or more "acquisition" correlator modules that de-spread the signals they receive, and identify the coarse timing of these signals. The receivers often have "tracking" correlator modules that de-spread the signals, and precisely identify the arrival time and other characteristics of the signals. Various challenges impact design and implementation of correlator modules: (1) different DSSS-based positioning systems may necessitate a different receiver correlator module since signal specifications for different systems can differ in terms of signal bandwidth, chipping rate and PN code length; (2) high clock rates used by correlator modules can result in high power consumption; (3) porting a correlator design to different architectures can be difficult since a correlator module is tightly coupled to a receiver's front-end modules; (4) correlator module implementations in ASIC's and FPGA's often require large logic and memory footprints; and (5) other challenges known in the art. Consideration of these and/or other challenges is needed when optimizing correlator modules. Different methods and systems for optimizing correlator modules are described in the disclosure that follows.

DETAILED DESCRIPTION

Described below are system and methods for improving correlation. Attention is initially drawn to examples of systems that may be used in whole or in part to carry out different methods described herein.

Figure 1:
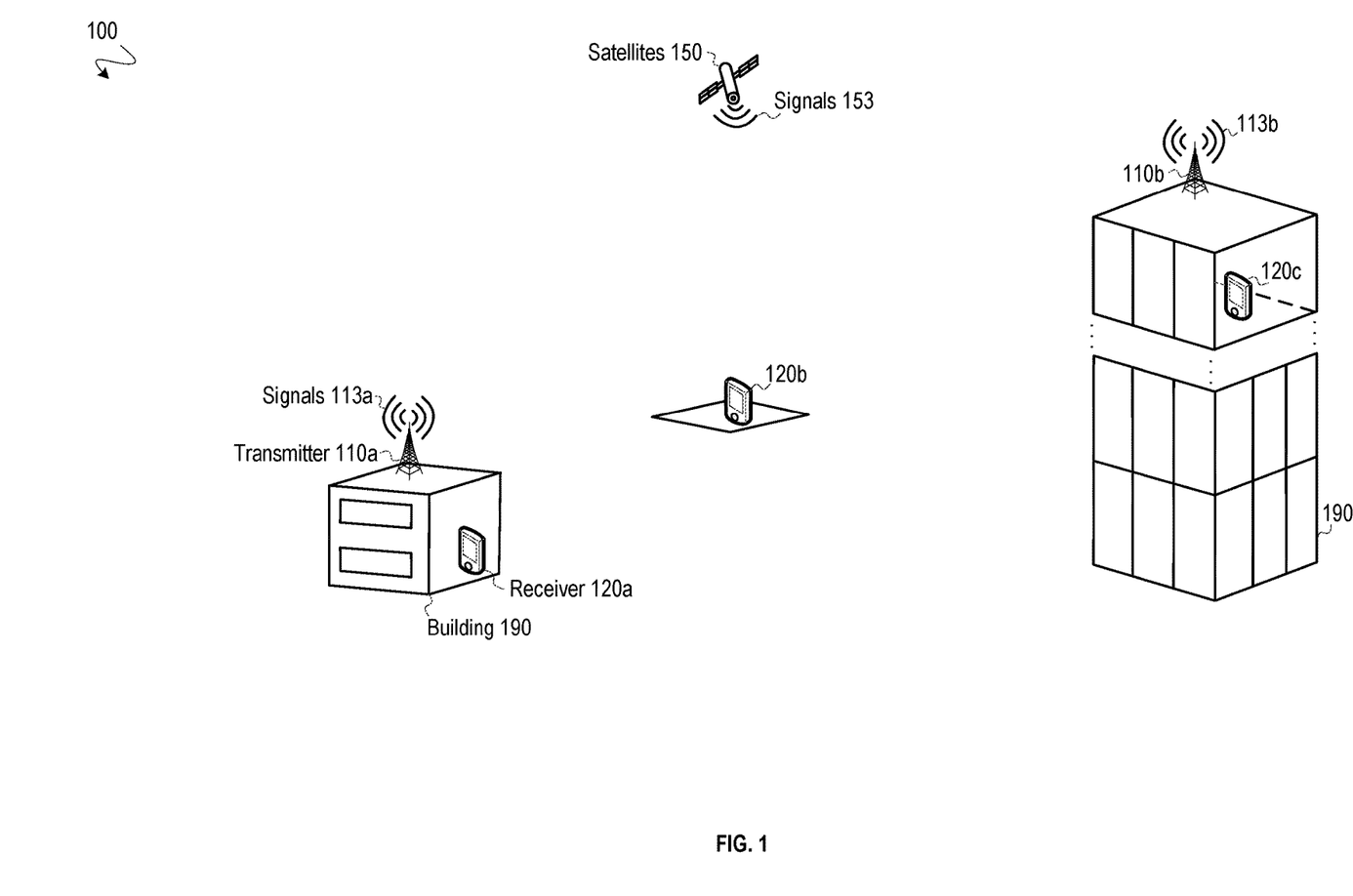
FIG. 1 depicts an operational environment for improving correlation.

FIG. 1 illustrates an operational environment for improving correlation. The operational environment contains a DSSS-based positioning system 100 that includes any number of receivers 120 (e.g., receivers 120a, 120b and 120c), one or more networks of terrestrial transmitters 110, and one or more networks of satellite transmitters 150. The terrestrial transmitters 110 and the receivers 120 may be located at different altitudes or depths that are inside or outside various manmade or natural structures 190. As shown, signals 113 and 153 are exchanged between the receivers 120 and the transmitters 110 and the satellites 150 using known wireless or wired transmission technologies. Of course, some embodiments may not include the signals 153, while other embodiments may not include the signals 113. Each of the signals 113 and 153 are modulated with a PN code (a sequence of pulses/chips) at their respective transmitters before transmission. In order for a receiver 120 to perform one or more of acquiring and tracking received signals, the receiver 120 correlates the received signals with a local copy of the PN code that was used to modulate the received signal.

Figure 2:
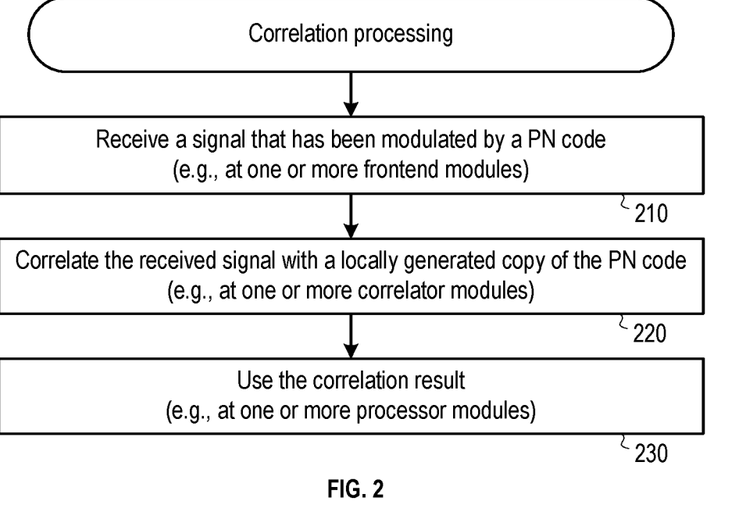
FIG. 2 illustrates functional details about correlating a received signal with a locally generated PN code.

FIG. 2 illustrates functional details about correlating a received signal with a locally generated PN code. As shown in FIG. 2, at step 210, a signal which has been modulated by a PN code at a transmitter before transmission is received at a frontend module of a receiver 120. At step 220, the received signal is correlated with a locally generated copy of the PN code (e.g., at a correlator module). At step 230, the results of the correlation are used (e.g., at a processor module). Details of the frontend module, the correlator module and the processor module are discussed later with reference to FIG. 3.

Since each transmitted signals may be part of a different positioning system (e.g., terrestrial system and satellite system, or two terrestrial systems, or other combination), the signals may be modulated with PN codes of different code lengths, bandwidths and chipping rates when transmitted. Thus, the receivers 120 may need to support a wide variety of DSSS systems. Unfortunately, a single correlator module may not support all types of DSSS systems, requiring the receiver 120 to have multiple correlator modules. However, integrating multiple correlator modules into the receiver 120 creates duplication of hardware and additional power burden on the receivers 120. Therefore, there is a need to provide an optimized correlator module at the receivers 120 that can correlate signals from multiple DSSS systems in an efficient manner.

Figure 3:
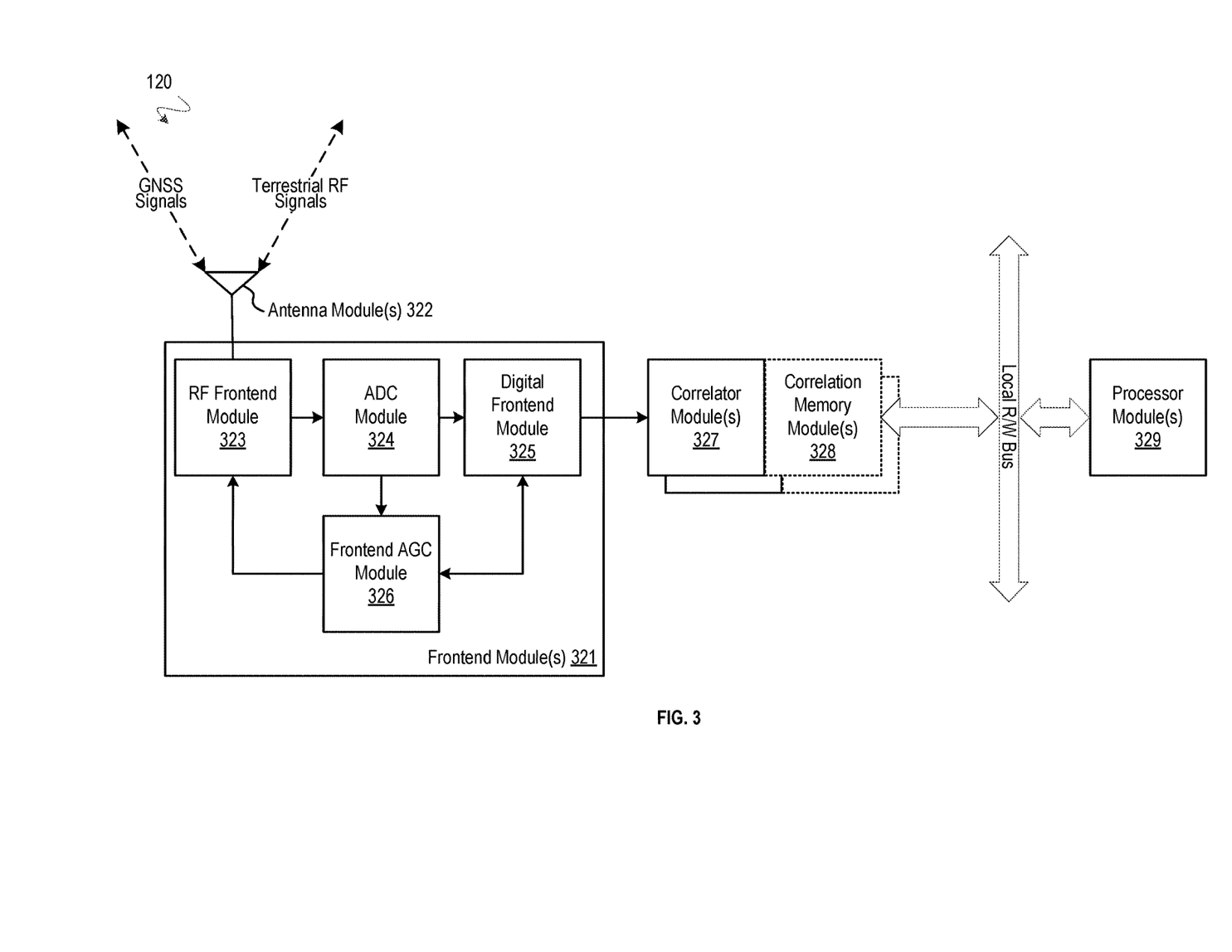
FIG. 3 illustrates one embodiment of a receiver used for improving correlation.

FIG. 3 illustrates one embodiment of a receiver 120 used for correlating signals. The receiver 120 includes various modules that are operable to carry out different steps of FIG. 2 and other methods. As shown, the modules may include: antenna module(s) 322 that are operable to receive signals; frontend module(s) 321 that are operable to perform step 210; correlator module(s) 327 and correlation memory module(s) 328 that are operable to carry out step 220; and processor module(s) 329 that are operable to carry out step 230.

The frontend module(s) 321 depict one embodiment of the frontend of the receiver 120. One skilled in the art will appreciate that there are many other receiver frontend topologies that are suitable to receive an RF signal. As shown, the frontend module(s) 321 are coupled to the correlator module(s) 327. The correlator module(s) 327 include one or more of a signal acquisition correlator module, a signal tracking correlator module, or other correlation modules. The correlator module(s) 327 may implement any number of correlation channels. Correlation channels are well known in the art. As shown, the correlation module(s) 327 are coupled to the correlation memory module(s) 328, and the correlation memory module(s) 328 are coupled to the processor module(s) 329. By way of example, the correlator module(s) 327 and the correlation memory module(s) 328 may include one or more FPGA(s), ASIC(s), DSP(s), general purpose processor(s) or other suitable component(s).

Signals received by the antenna module(s) 322 may include GNSS signals, terrestrial RF signals or any other signals modulated with a PN code, which are known in the art. Signals received by the antenna module(s) 322 are transmitted to the frontend module(s) 321. The frontend module(s) 321 convert the received signals into digital representations of the received signals ("signal"), and then transmit the signal to the correlator module(s) 327. The correlator module(s) 327 and the correlation memory module(s) 328 are used to correlate the signal against a locally generated PN code before transmitting the correlation results to the processor(s) 329. The processor(s) 329 use the correlation results to identify transmitted data, to estimate a time of arrival (TOA) of the received signal, to adjust a tracking channel, or other known operations.

Attention is now drawn to particular approaches for improving correlation—e.g., at step 220 of FIG. 2.

The correlation of a signal with a locally generated PN code performed by the correlator module 327 for n=0 to n=w−1, can be expressed as:

$$C[n] = \sum_{\substack{i=0 \\ j=n}}^{\substack{i=P-1 \\ j=(n+P-1)\%P}} x[i] * c[j],$$ (Equation 1)

where C is the correlation function, x is the received signal sampled at one sample per chip, c is the locally generated PN code, n is the current position in the correlation window, P is the length of the PN code and w is the width of the correlation window, and % P describes the wrap-around of the PN code sequence after the last value.

With reference to Equation 1, an optimized correlation method using time-slice based processing is described below. The received signal x[i] is decomposed into k equal time "slices" $x_0, x_1 \ldots x_{k-1}$. Similarly, the locally generated PN code c is decomposed into $c_0, c_1 \ldots c_{k-1}$.

Equation 1 can be applied sequentially for slices of the received signal, as shown below in Equation 2:

$$Cs_0[n] = \sum_{\substack{i=0 \\ j=n}}^{\substack{i=P'-1 \\ j=(n+P'-1)\%P}} x_0[i] * c_0[j];$$ (Equation 2)

$$Cs_1[n] = \sum_{\substack{i=0 \\ j=n}}^{\substack{i=P'-1 \\ j=(n+P'-1)\%P}} x_1[i] * c_1[j];$$

and so on for each slice where P' is the number of samples in each slice, and % P describes the wrap-around of the PN code sequence after the last value.

The resulting "Slice Correlation Functions", $Cs_i[n]$ are accumulated over all the k slices to recover the actual correlation function, C:

$$C[n] = \Sigma_{i=0}^{k-1} Cs_i[n]$$ (Equation 3)

In another embodiment, Equations 1, 2 and 3 are also applicable to received signal x when sampled at rate S samples per chip by simply interpolating the PN code c by a factor of S.

One benefit of this time-slice operation is that a correlator module need only store the received samples, x, for one slice. This greatly reduces the memory requirements of the correlator module compared to other implementations that store all of the received samples. Once the signal is decomposed into k slices, each slice can be further sub-divided (again applying Equation 3), and can be processed in parallel to increase throughput of operation.

Figure 4:
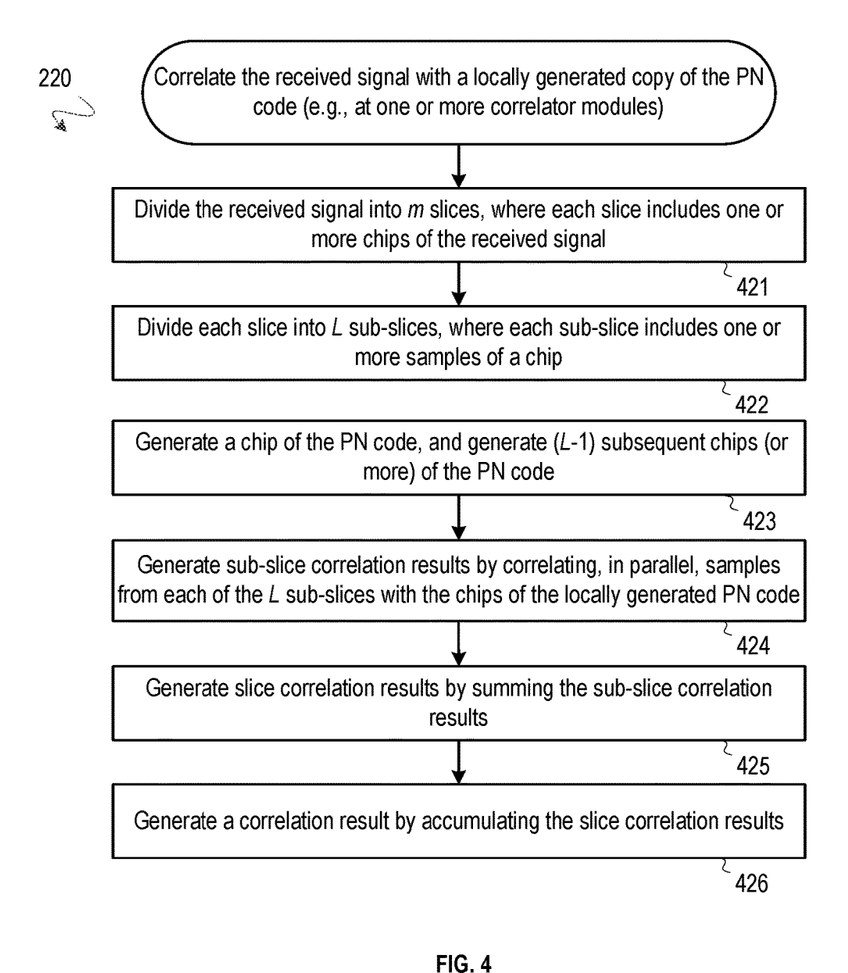
FIG. 4 depicts functional details of correlating a received signal with a locally generated copy of the PN code.

This method is summarized in FIG. 4, which depicts functional details of correlating a received signal with a locally generated copy of the PN code using the optimized correlation method.

Figure 5:
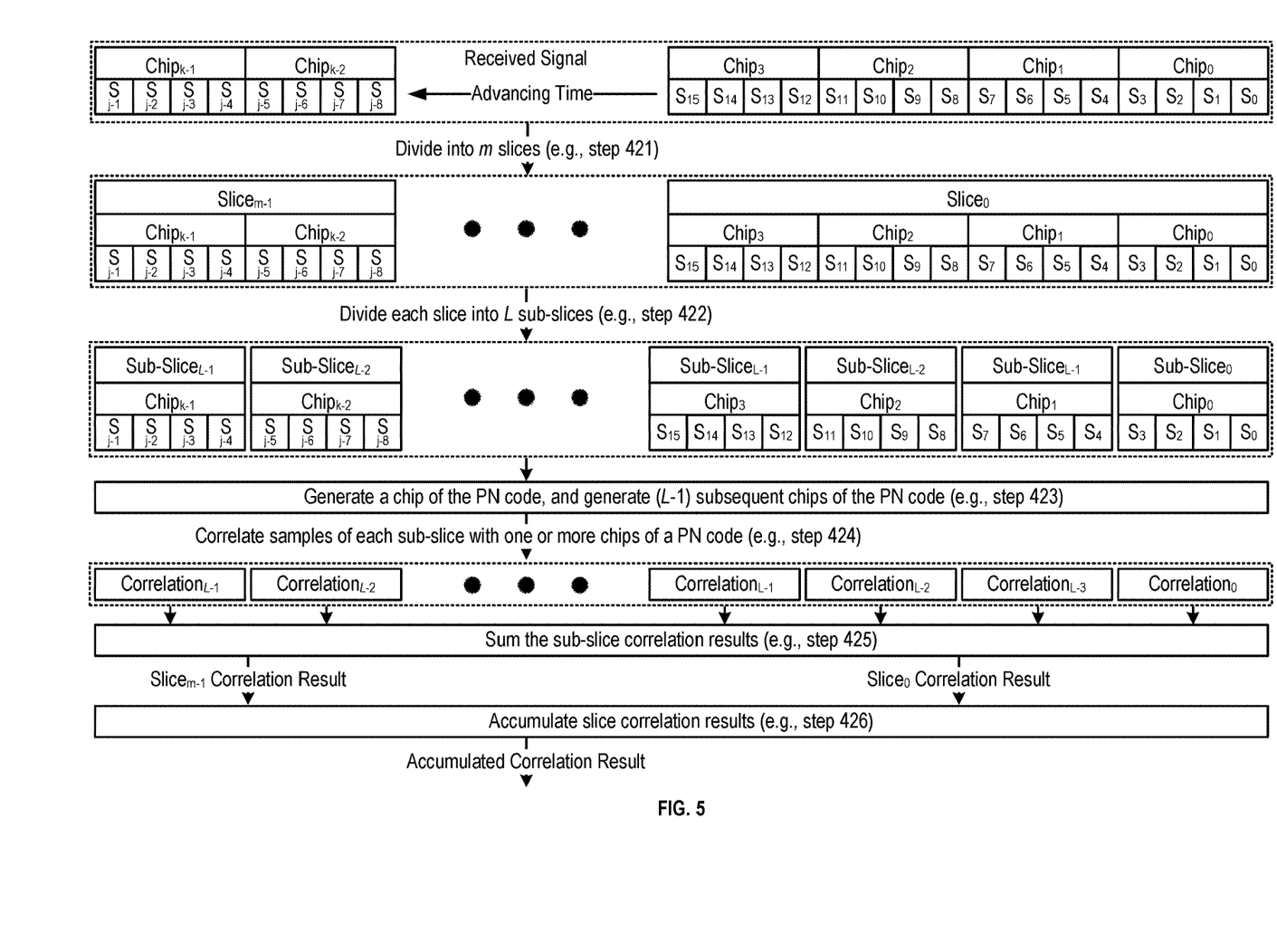
FIG. 5 illustrates correlation of a received signal with a locally generated copy of the PN code.

The steps shown in FIG. 4 may be read with reference to FIG. 5, which illustrates correlation of a received signal with a locally generated copy of the PN code.

As shown, at step 421, the received signal is divided into m slices, where each slice includes one or more chips of the received signal. In one embodiment, each slice is generated when a sufficient number of samples of the received signal have been received. In another embodiment, samples of the received signal corresponding to more than one slice are first stored in a storage module (e.g., a buffer, memory, solid state storage, etc.) before the m slices are generated using samples of the stored signal.

At step 422, each slice is divided into L sub-slices, where each sub-slice includes one or more samples of a chip. At step 423, a chip of the PN code, and L−1 subsequent chips of the PN code are generated (e.g., the number of chips is equal to the number of sub-slices). In another embodiment the number of chips of the PN code generated are greater than L. At step 424, sub-slice correlation results are generated by correlating, in parallel, samples from each of the L sub-slices with the chips of the locally generated PN code. At step 425, slice correlation results are generated by adding the sub-slice correlation results. At step 426, correlation results are generated by accumulating the slice correlation results.

Certain benefits of the parallel processing are explained below.

Figure 8:
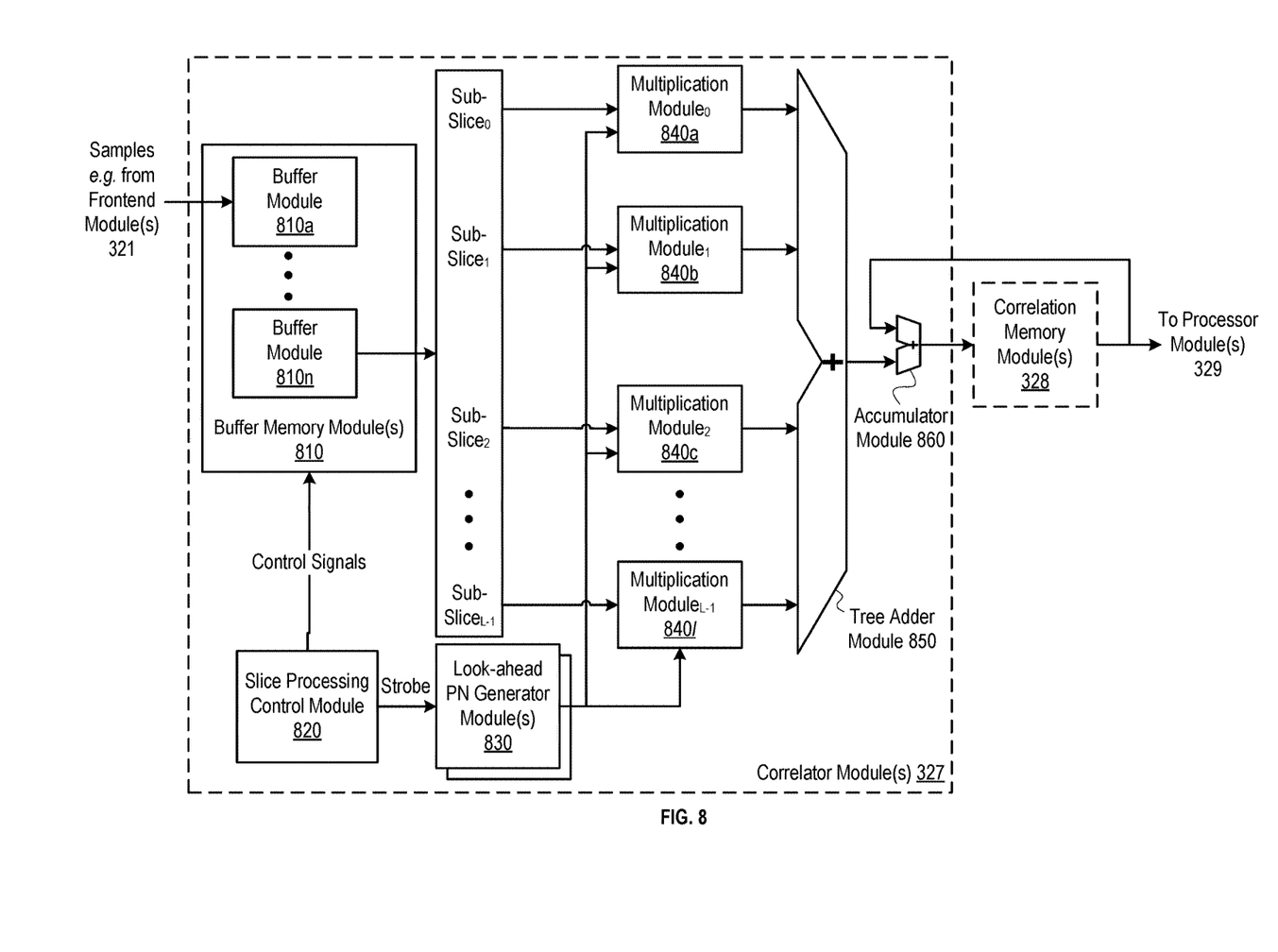
FIG. 8 illustrates one embodiment of a correlator module used for improving correlation.

An example correlator module 327 configured for a chipping rate of 2.557M chips/s with a PN code of length 2047 and sampling rate of 20.46 MHz will need to process data at a rate of 654.72 $e^6$ MAC/s operations for a 32 chip correlation window w. This implies that a sequential correlator (e.g., rather than a parallel correlator as described above) capable of performing 1 multiply-accumulate operation per clock cycle would need to operate at 655 MHz. This clock rate requires an advanced ASIC technology, and may not work on an FPGA.

However, by modularizing the correlator modules to form parallel processing "lanes" that each process an allocated time-sub-slice, the massive processing burden can be parallelized into blocks that operate at a lower clock frequency. In this example, a lane count of L=4 (e.g., 4 parallel sub-slice correlations) will reduce the requirement to a moderate 164 MHz.

As was explained previously, the L "lanes" together represent one time-slice of the correlator samples. The samples for each lane are multiplied with the corresponding chip from the PN generator and the result from each lane is added together to produce each entry of $C_s[n]$.

The number of such parallel processes proportionately reduces the maximum operating frequency of the processing chain. By scaling L, a correlator module designer can achieve the appropriate balance between frequency of operation and required logic area.

Additionally, the optimized correlator module design allows the correlator module to be adaptively or flexibly clocked. For instance, in order to process signals from different DSSS systems, a correlator module's frequency needs to meet a minimum frequency as dictated by received signal type and correlation window width w of a signal. This implies that optimal clock frequency for a correlator designed for multiple systems depends on the type of signal being processed at that time. The slice base processing in the correlator module allows clock-gating (e.g., switching OFF the clock) once a slice is processed (e.g., $C_s[n]$ is computed), and the correlator module is waiting for the next slice to be filled into a memory buffer 810. Alternately, for systems that allow clock rate switching, the correlator module clock (not shown) can be dynamically switched to the optimal frequency for that specific signal. This fine-grained clocking flexibility helps in reducing the power consumption of the correlator module.

Additional details about particular steps of FIG. 4 are discussed below starting with FIG. 6.

Figure 6:
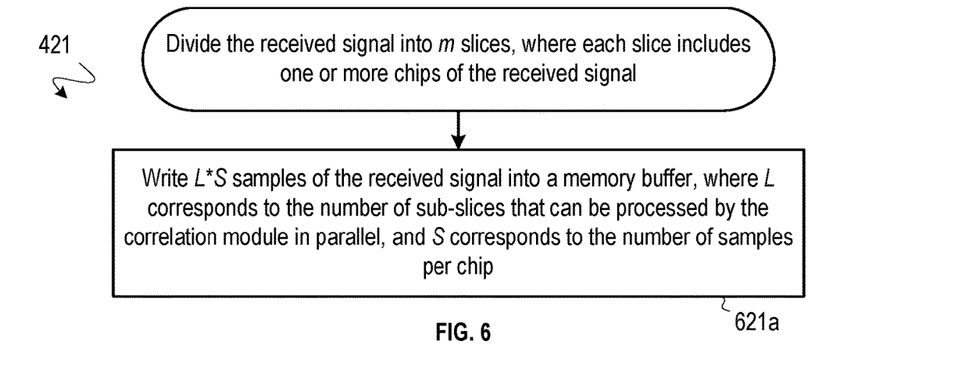
FIG. 6 illustrates functional details of dividing a received signal into slices, where each slice includes one or more chips of the received signal.

By way of example, FIG. 6 illustrates functional details of dividing a received signal into m slices, where each slice includes one or more chips of the received signal (i.e., step 421 of FIG. 4). At step 621a, L*S samples of the received signal are written into a memory buffer, where L corresponds to the number of sub-slices that can be processed by the correlator module in parallel, and S corresponds to the number of samples per chip. In one embodiment, the samples are written into the memory buffer as they are received. This process continues until the memory buffer has accumulated L*S samples of the received signal, at which point downstream processing can begin. In another embodiment, the L*S samples are written to the memory buffer from a signal that was previously received (e.g., the L*S samples are read from a buffer or other memory storage).

Figure 7:
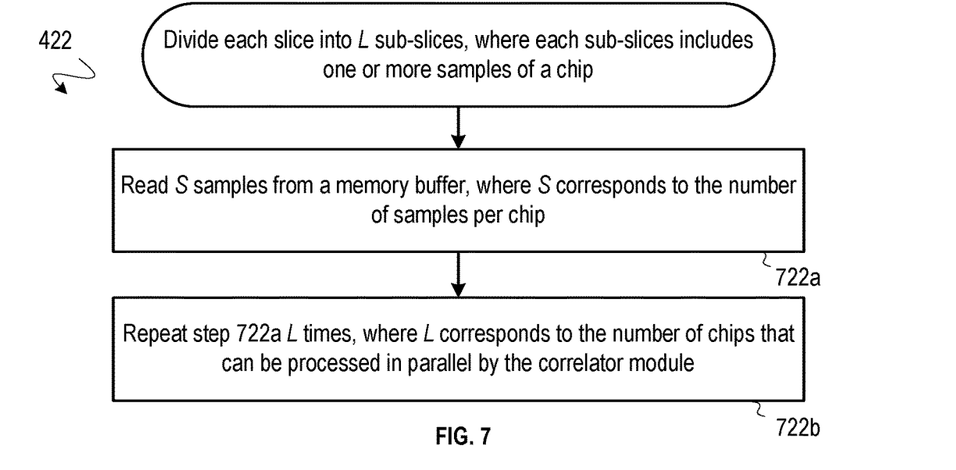
FIG. 7 illustrates functional details of dividing each slice into sub-slices, where each sub-slice includes one or more samples of a chip.

By way of example, FIG. 7 illustrates functional details of dividing each slice into L sub-slices, where each sub-slice includes one or more samples of a chip signal (i.e., step 422 of FIG. 4). At step 722a, S samples are read from the memory buffer, where S corresponds to the number of samples per chip. Then, at step 722b, step 722a is repeated L times, where L corresponds to the number of chips that can be processed in parallel by the correlator module. In one embodiment, each of the L readings of S samples sends those particular S samples to a different destination. For example, in one embodiment there are L "multiply and accumulate" ("MAC") modules, and each group of S samples is transmitted to a different MAC or correlator module.

Attention is now drawn to FIG. 8, which illustrates one embodiment of the correlator module 327 used to carry out different steps of FIG. 4 through FIG. 7. As shown, the modules may include: buffer memory module(s) 810 that implement n memory buffers 810a through 810n, which are operable to perform steps 421 and 422; a slice processing control module 820, which is operable to provide control signals to the buffer memory module(s) 810 when performing steps 421 and 422; one or more look-ahead PN generator module(s) ("PN generators") 830, which are operable to perform step 423; L multiplication modules 840a through 840n, and a tree adder module 850, which are operable to perform steps 424 and 425; and an accumulator module 860, which is operable to perform step 426.

The buffer memory module(s) 810 are coupled to the frontend module(s) 321, the slice processing control module 820 and the multiplication modules 840; the slice processing control module 820 is coupled to the look-ahead PN generator module 830; the look-ahead PN generator module 830 is coupled to the multiplication modules 840; the multiplication modules 840 are coupled to the tree adder module 850; the tree adder module 850 is coupled to the accumulator module 860, which is coupled to the correlation memory module(s) 328; and the correlation memory module(s) 328 are coupled to the processor module(s) 329.

As shown, samples from the frontend module(s) 321 are written into an available memory buffer 810 (e.g., memory buffer 810a). In one embodiment, the buffer memory module(s) 810 implement a circular buffer made up of n memory buffers. Control signals are transmitted from the slice processing control module 820 to the buffer memory module(s) 810 to control the writing and reading (e.g., addressing) of the memory buffers modules 810. In this example, L*S incoming samples are written into the available memory buffer 810. In sequence, or in parallel, the L*S samples previously written to memory buffer 810n are read. Each of the L groups of S samples read are transmitted to a different parallel multiplication module 840 of the L multiplication modules 840a through 840l.

The look-ahead PN generator module(s) 830 also receive control signals (e.g., a strobe) from the slice processing control module 820. The control signals are used by the PN module 830 to control the advancement of the PN module's state. PN chips from the PN module 830 are transmitted to the multiplication modules 840a-l. Each PN chip is multiplied with a sample of the S samples corresponding to a particular multiplication module 840.

Each result from each of the multiplication modules 840*a-l* is transmitted to the tree adder module 850. The tree adder module 850 adds the multiplication results transmitted from each of the multiplication modules 840*a-l* for each of the S samples corresponding to that multiplication module 840, producing a total sum for the L multiplication modules 840*a-l*. That is, the tree adder is used for both steps 424 and 425 of FIG. 4 to generate a slice correlation result.

The slice correlation result from the tree adder module 850 is transmitted to the accumulator module 860. The accumulator module accumulates the tree adder's result with the previous slice's sum to generate a correlation result. In one embodiment, the correlation result is considered to be complete when all of the slices of a transmitted signal have been accumulated. The correlation result is then transmitted to the processor module(s) 329.

Any of the frontend module(s), correlator module(s), correlation memory module(s), and/or processor module(s) may be implemented using an FPGA, an ASIC, one or more digital signal processors, or other suitable module. In one embodiment, the correlator module 327 is implemented using an FPGA. In another embodiment, the correlator module 327 is implemented using an ASIC. In yet another embodiment, the correlator module is implemented using one or more digital signal processors. Other suitable modules are contemplated as would be understood by one of ordinary skill in the art.

Figure 9:
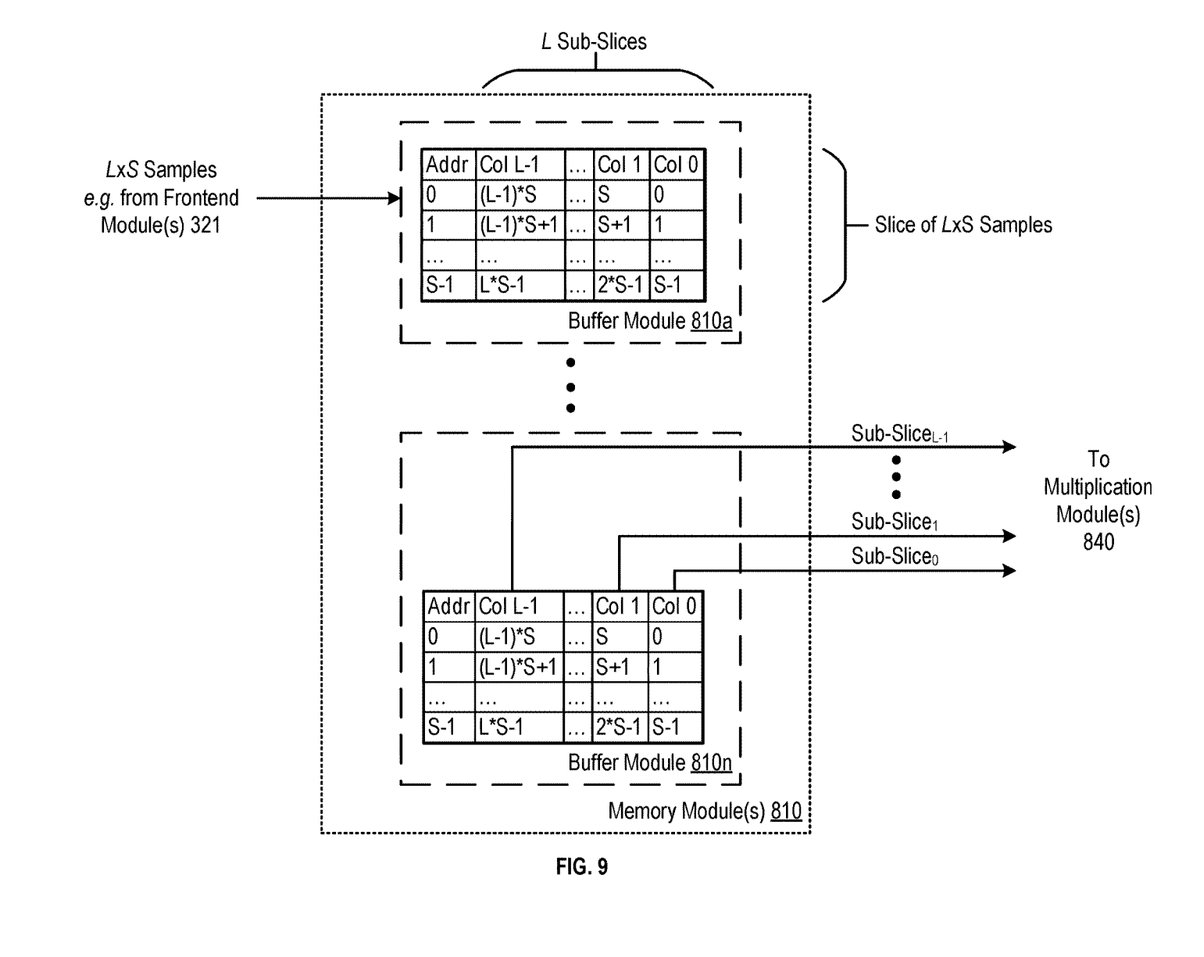
FIG. 9 illustrates one embodiment of one or more memory module(s) used for improving correlation.

FIG. 9 illustrates one embodiment of the buffer memory module(s) 810 used for improving correlation.

Note that L*S samples from the frontend module(s) 321 are written into the memory buffer 810*a*. In this example, the memory buffer 810*a* implements L columns, where each column contains S samples. Thus, each column corresponds to a sub-slice of the slice of L*S samples.

As shown, the previously written memory buffer 810 is read such that each column (e.g., sub-slice) is sent to a different parallel multiplication module 840. That is, each multiplication module 840 is "responsible" for all S samples of a sub-slice.

In one embodiment, the buffer memory module(s) 810 are implemented in an FPGA or ASIC using a standard memory systems (e.g., RAM) commonly available in FPGA/ASIC systems, as opposed to using D-Flip-Flop/register-array elements. In this embodiment, the memory meets at least the following criteria: dimensions of at least 2*S*L*W, where W is the bit-width of each of the S samples; L column write-enables; simple dual port (e.g., one write-port, one read-port); and independent write and read clocks. In this embodiment, the buffer memory module(s) 810 are separately clocked at read and write ports, which offers flexibility to use various combinations of clock rates for the correlator module(s) 327. This is advantageous as it makes the interface to the processor modules(s) 329 independent of the frontend clock domain. Indeed, one embodiment of a system offers flexibility to use various combinations of clock rates for the correlator module, un-coupled from a frontend module.

Look-Ahead PN Code Generation

PN code generators, such as linear-feedback shift registers (LFSR's) are well known in the art. However, to correlate samples of a received signal in parallel, where the received signal has been decomposed into slices and sub-slices, a modified PN code generator topology may be used. The modifications enable the modified PN code generator to produce L chips of a PN code in parallel across a correlation window of width, w, and then adjust the state of the PN generator to process the next slice of received data.

Figure 10:
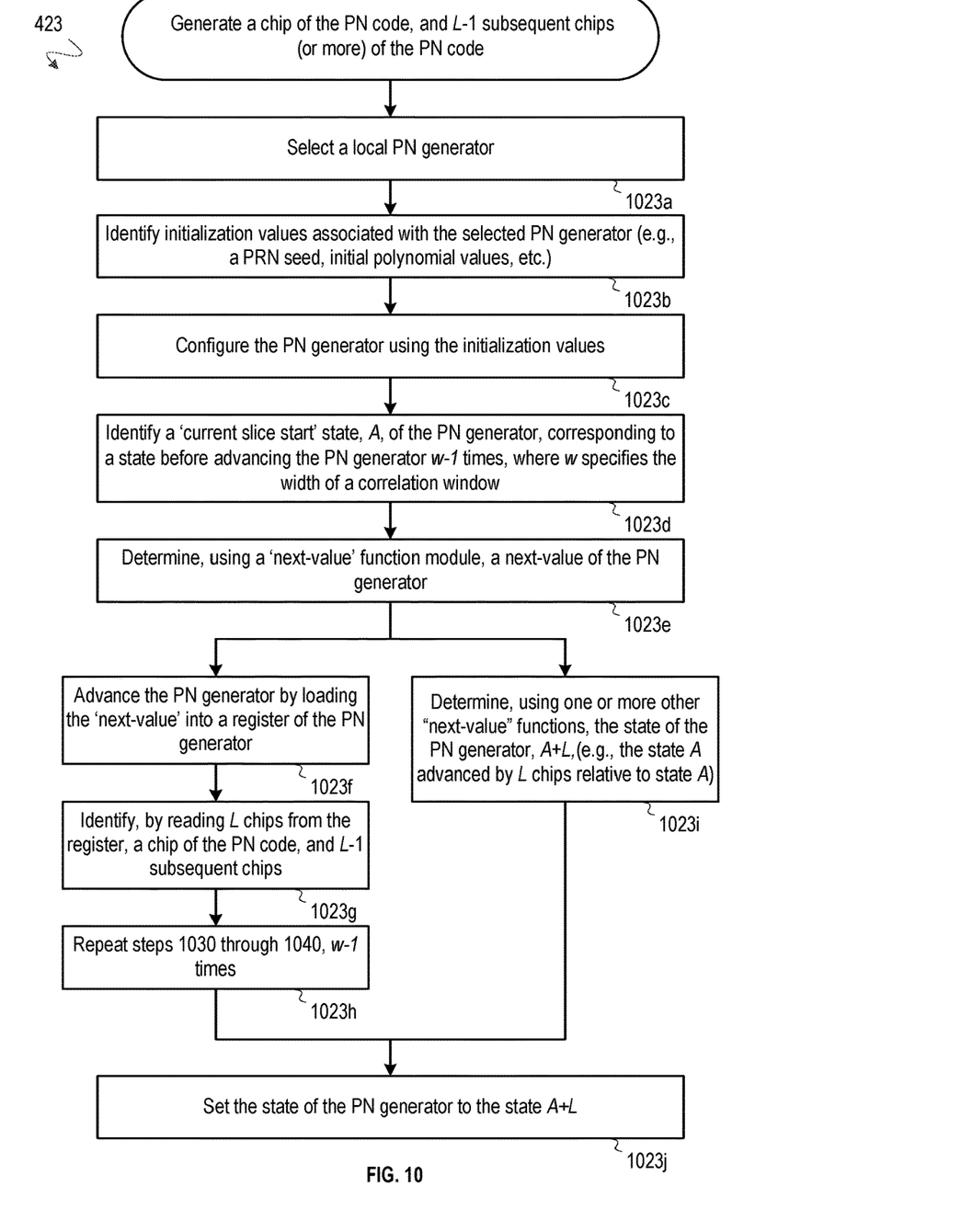
FIG. 10 illustrates functional details of generating a chip and subsequent chips (or more) of a PN code.

FIG. 10 illustrates functional details of generating a chip of a PN code, and L−1 subsequent chips (or more) of the PN code.

Figure 13:
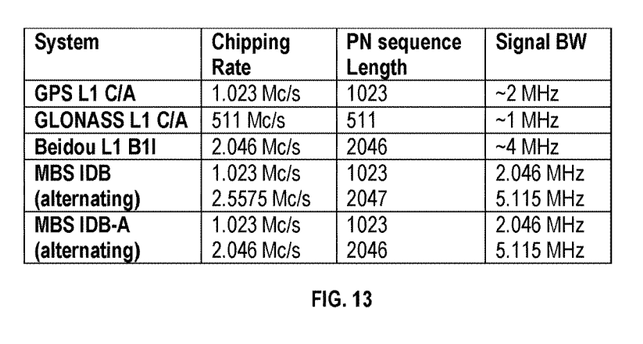
FIG. 13 illustrates example signal specifications used in a variety of DSSS systems.

At step 1023*a*, a local PN generator is selected. That is, a particular look-ahead PN generator module 830 is chosen for use (e.g., by a processor module). In one embodiment, the correlator module(s) 327 has more than one PN generator module 830, where each of the PN generator modules 830 is configured to generate one or more particular PN codes corresponding to particular DSSS systems. For example, if the receiver 120 is configured to receive signals of a satellite navigation system, a PN generator 830 that supports GPS L1 C/A, GLONASS L1 C/A or Beidou L1 B1I signal specifications would be selected as appropriate. Such signal specifications are illustrated in the table of FIG. 13.

At step 1023*b*, initialization values associated with the selected PN generator (e.g., a PRN seed, initial polynomial values, etc.) are identified (e.g., from a lookup table by a processor module). A PRN seed represents the initial state of the PN generator. Use of these initialization values is discussed later with reference to FIG. 12. Step 1023*b* may have occurred as part of step 1023*a*. For example, a particular PN generator 830 may be pre-configured to generate a PN code associated with a particular DSSS system (e.g., GPS).

Next, at step 1023*c*, the selected PN generator 830 is configured using the initialization values. At step 1023*d*, a 'current slice start' state, A, of the PN generator is identified. This state corresponds to state of the PN generator 830 before its state is advanced w-1 times, where w specifies the width of a correlation window. Next, at step 1023*e*, a next-value is determined using a next-value function of a next-value module. At step 1023*f*, the state of the PN generator 830 is advanced using the next-value of the PN generator (e.g., by loading the next-value(s) into a register of the PN generator). At step 1023*g*, a chip of the PN code and L−1 subsequent chips of the PN code are identified by reading L chips from the register. At step 1023*h*, steps 1030 through 1040 are repeated w-1 times, where w is the width of the correlation window.

At step 1023*i*, the state of the PN generator, A+L (the state A, advanced by L chips), is determined using one or more next-value functions. Finally, at step 1023*j*, the PN generator is set to the state of state of A+L.

Step 1023*i* is performed because, at step 1023*h*, the PN generator 830 was advanced w-1 times in order to correlate each of the samples of the current slice with chips of the PN code spanning the entire correlation window w. However, when it is time to correlate the samples of the next slice with chips of the generated PN code, the next samples need to be correlated with chips of the PN code only advanced by L chips relative to what the state of the PN code was at the beginning of the previous slice. Therefore, it is necessary to return the PN generator to the state that is only advanced by L chips relative to the state of the PN generator at the beginning of the previous slice. This is illustrated and discussed later with reference to FIG. 11.

Figure 11:
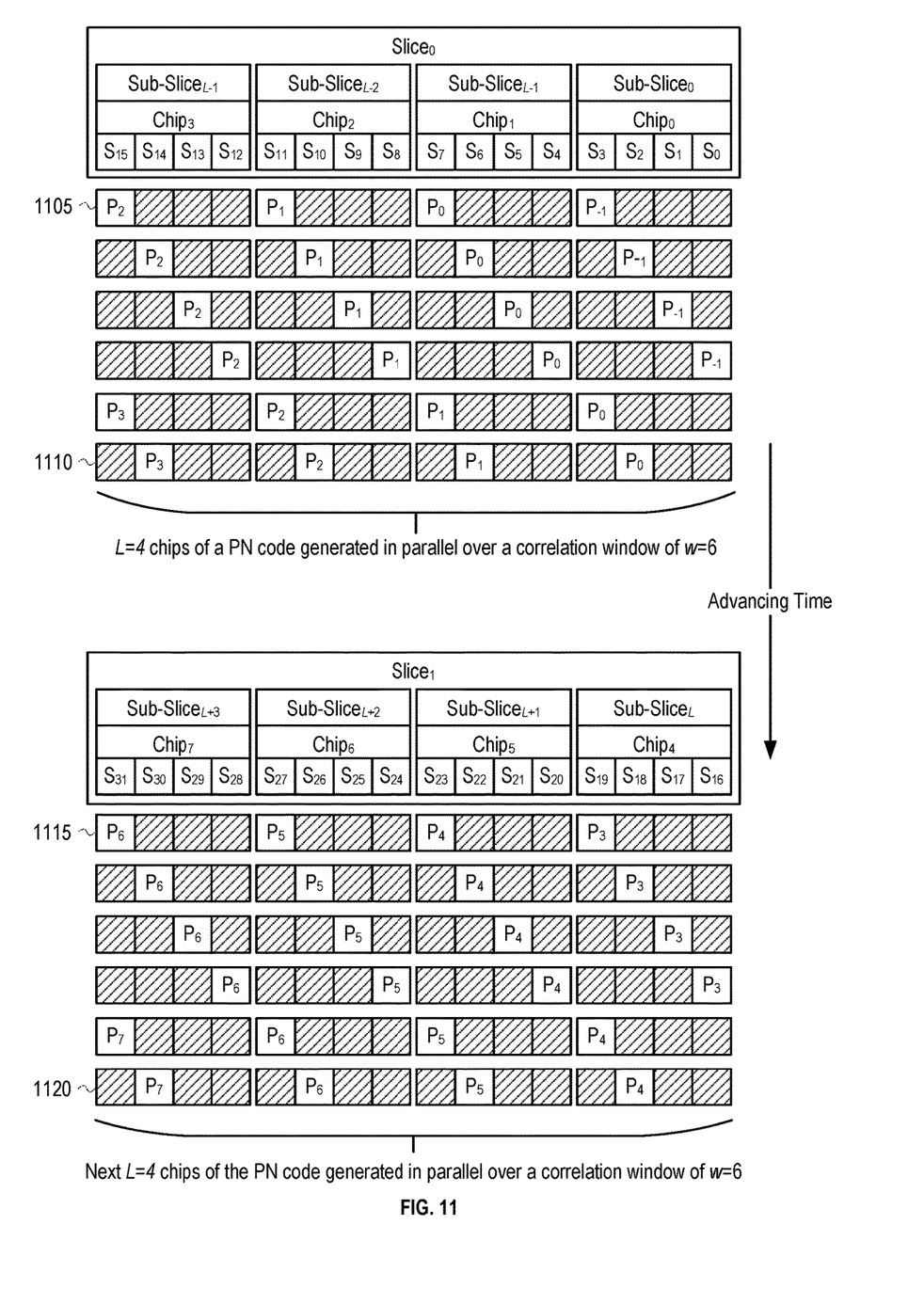
FIG. 11 illustrates a series of chips of a PN code as the state of a PN generator is advanced in time.

FIG. 11 illustrates a series of chips of a PN code as the state of a PN generator is advanced in time. Each row of the series 1105 through 1110 and the series 1115 through 1120 shows the PN code generated at a particular state of the PN generator. The state of the PN generator is advanced between each row.

Samples of the received signal shown correspond to two slices, $Slice_0$ and $Slice_1$. Samples $S_0$ through $S_{15}$ correspond to the samples of $Slice_0$ and samples $S_{16}$ through $S_{31}$ correspond to samples of $Slice_1$. In this illustration, the number of parallel correlations L=4 and the correlation window w=6, and sampled at rate 4 samples-per-chip.

As shown in FIG. 11, during the processing of each slice, a series of L chips of a PN code are generated across a correlation window w. That is, the state of the PN generator is advanced w-1 times from the initial state. Each time the PN generator is advanced, it generates L chips of the PN sequence in parallel (e.g., $PN_{-1}$, $PN_0$, $PN_1$ and $PN_2$). As the state of the PN generator is advanced, the chips of the PN sequence "slide" relative to samples of the received signal. For example, the chips of the PN sequence shown in row 1110 have been advanced five times relative to the chips shown in row 1105.

Each time the state of the PN generator 830 is advanced, a chip of the PN code is correlated with a different sample of the received signal. For example, at the time corresponding to row 1105, chip $P_2$ will be correlated with sample $S_{15}$. After the state of the PN generator has been advanced 5 times, as shown at row 1110, chip $P_2$ will be correlated with sample $S_{10}$.

After processing of $Slice_0$ is complete, processing of the next slice begins ($Slice_1$). However, as was discussed with reference to step 1023*j* of FIG. 10, before processing of the next slice begins, the state of the PN generator must be returned to a state of C+L. For example, note that the chips of row 1115 are advanced by L=4 chips relative to the chips of row 1105.

Figure 12:
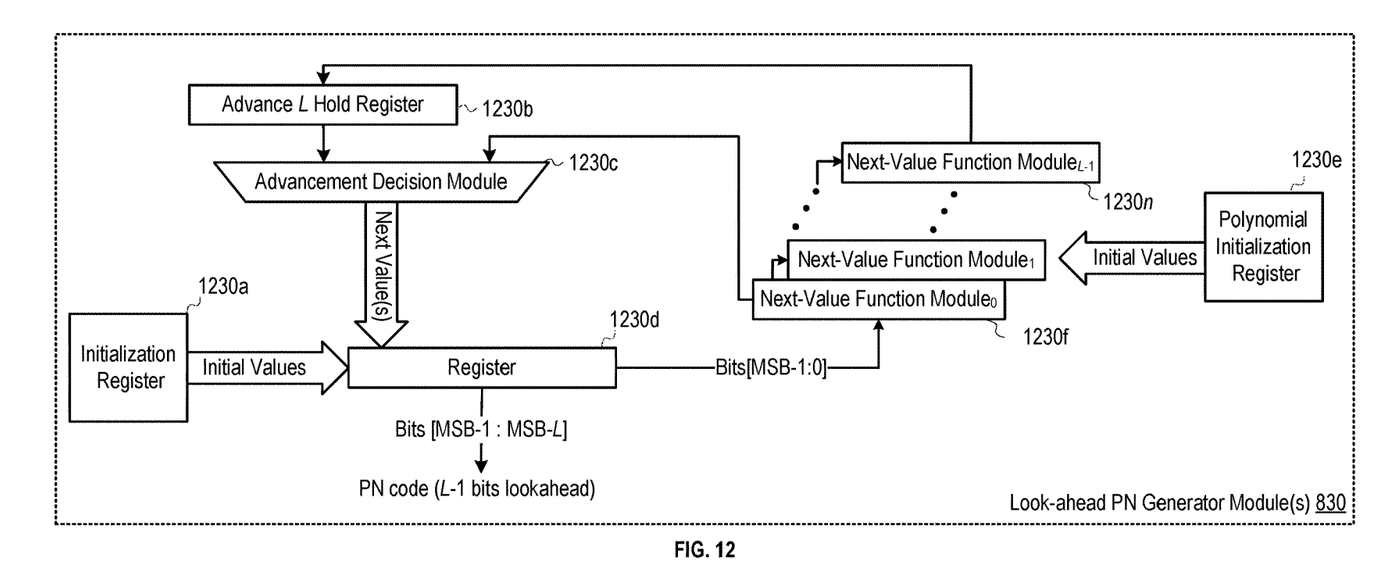
FIG. 12 illustrates one embodiment of a look-ahead PN generator module used for improving correlation.

Attention is now turned to FIG. 12, which illustrates one embodiment of the look-ahead PN generator module 830 used for improving correlation. The look-ahead PN generator module ("PN Generator") 830 includes various modules that are each operable to carry out different steps of FIG. 10.

As shown in FIG. 12, the modules may include: an initialization register 1230*a*; an advance L hold register 1230*b*; an advancement decision module 1230*c*; a register 1230*d*; a polynomial initialization register 1230*e*; and next-value function modules 1230*f* through 1230*n*. In one embodiment, the next-value function modules are cascaded L times.

The initialization register 1230*a* is coupled to the register 1230*d*; the polynomial initialization register 1230*e* is coupled to the next-value functions 1230*f* through 1230*n*; at least one of the next-value function modules 1230*f* and 1230*n* is coupled to the hold register 1230*b*; at least one of the next-value function modules 1230*f* and 1230*n* is coupled to the advancement decision module 1230*c*; the hold register 1230*b* is coupled to the advancement decision module 1230*c*; and the advancement decision module 1230*c* is coupled to the register 1230*d*.

With reference to step 1023*c* of FIG. 10, the initialization register 1230*a* contains the PN code seed which is loaded into the register 1230*d* to set the initial state of the PN generator. The polynomial initialization register 1230*e* contains initial values that will be used by the cascaded next-value function modules 1230*f* through 1230*n* with an indication of which taps should be used to express a particular polynomial.

With reference to step 1023*e* of FIG. 10, the next-value function module 1230*f* is used to determine a value produced using one or more bits of the register 1230*d*. In one embodiment, the next-value function module 1230*f* performs a logical XOR operation on two or more bits of the register 1230*d* to generate the next-value. In another embodiment, the next-value function module 1230*f* performs a different operation using bits of the register 1230*d* to generate the next-value.

The next-value function module 1230*f* and the advancement decision module 1230*c* are operable to perform step 1023*f* of FIG. 10. During processing of a slice, the next-value is passed from the next-value function module 1230*f* through the advancement decision module 1230*c* and loaded into the register 1230*d*.

The register 1230*d* is operable to perform 1023*g* of FIG. 10, whereby a chip of the PN code and L−1 subsequent chips of the PN code are identified by reading L chips from the register 1230*d*. In one embodiment, the next-value is loaded into the register 1230*d* and the L chips of the PN code are read from the MSB portion of the register 1230*d*.

With reference to step 1023*i* of FIG. 10, the state of the PN generator, C+L (the state C, advanced by L chips), is determined using one or more of the L cascaded next-value functions 1230*f* through 1230*n*.

That is, the L cascaded next-value registers 1230*f* through 1230*n* are used to determine the state of the PN generator advanced by L chips from the state of the PN generator at the beginning of the slice that is currently being processed by the correlator module(s) 327. This state is denoted as "C+L". Upon determining L next-values (chips) of state C+L, these values are loaded into the advance L hold register 1230*b* and stored until processing of the current slice is complete.

During intra-slice processing the advancement decision module 1230*c* loads the next-value produced by the next-value function module 1230*f* into the register 1230*d*. After processing of the slice is complete, the L next-value chips stored in the advance L hold register 1230*b* are loaded into the register 1230*b* via the advancement decision module 1230*c*.

FIG. 13 illustrates example signal specifications used in a variety of Direct-Sequence Spread Spectrum (DSSS) based positioning systems. The table shown in FIG. 13 provides example signal specifications of satellite-based positioning systems such as GPS, GLONASS and Beidou as well as signal specifications of a terrestrial-based positioning system, Metropolitan Beacon System (MBS) as implemented by NextNav, LLC.

Particular Embodiments

Methods of this disclosure may be implemented by hardware, firmware or software. One or more non-transitory machine-readable media embodying program instructions that, when executed by one or more machines, cause the one or more machines to perform or implement operations comprising the steps of any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

Systems comprising one or more modules that perform, are operable to perform, or adapted to perform different method steps/stages disclosed herein are also contemplated, where the modules are implemented using one or more machines listed herein or other suitable hardware. When two things (e.g., modules or other features) are "coupled to" each other, those two things may be directly connected together (e.g., shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems; RF front end module(s) with circuitry components that are known or disclosed herein); processing module(s) for performing signal processing (e.g., generating signals for transmission at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g., pressure, temperature, humidity, wind, or other); and/or interface module(s) for exchanging information with other systems via other links other than a radio link. Signals transmitted by a transmitter may carry different information that, once determined by a receiver or a server, may identify the following: the transmitter; the transmitter's location (LLA); pressure, temperature, humidity, and/or other conditions at or near the transmitter.

A receiver may be in the form of a computing device (e.g., a mobile phone, tablet, laptop, digital camera, tracking tag), and may include any of: antenna module(s) for exchanging signals with other systems; RF front end module(s) with circuitry components that are known or disclosed herein; processing module(s) for signal processing of received signals to determine position information (e.g., times of arrival or travel time of received signals, atmospheric information from transmitters, and/or location or other information associated with each transmitter), for using the position information to compute an estimated position of the receiver, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the receiver (e.g., pressure, temperature, humidity, wind, other), which may be compared to the same environmental conditions at or near transmitters to determine the altitude of the receiver; other sensor module(s) for measuring other conditions (e.g., acceleration, velocity, orientation, light, sound); interface module(s) for exchanging information with other systems via other links other than a radio link; and/or input/output module(s) for permitting a user to interact with the receiver. Processing by the receiver can also occur at a server.

It is noted that the term "positioning system" may refer to satellite systems (e.g., Global Navigation Satellite Systems (GNSS) like GPS, GLONASS, Galileo, and Compass/Beidou), terrestrial systems, and hybrid satellite/terrestrial systems.

Related Applications

This application relates to the following related application(s): U.S. patent application Ser. No. 62/351,825, filed Jun. 17, 2016, entitled METHODS & SYSTEMS FOR IMPROVING CORRELATION. The content of each of the related application(s) is hereby incorporated by reference herein in its entirety.

The invention claimed is:
1. A method for improving correlation, the method comprising:
   receiving a signal;
   dividing the signal into a plurality of slices;
   dividing each of the slices into a plurality of sub-slices;
   generating a plurality of chips of a PN code;
   generating a plurality of sub-slice correlation results in parallel;
   generating a plurality of slice correlation results by summing the plurality of sub-slice correlation results; and
   generating a correlation result by accumulating the plurality of slice correlation results,
   wherein the signal is divided into a plurality of slices by writing a group of L*S samples of the signal into a memory module a plurality of times,
   wherein each group of L*S samples corresponds to a slice, L denotes the number of sub-slices that can be processed in parallel by a correlation module, and S denotes the number of samples per chip of the signal.
2. A method for improving correlation, the method comprising:
   receiving a signal;
   dividing the signal into a plurality of slices;
   dividing each of the slices into a plurality of sub-slices;
   generating a plurality of chips of a PN code;
   generating a plurality of sub-slice correlation results in parallel;
   generating a plurality of slice correlation results by summing the plurality of sub-slice correlation results; and generating a correlation result by accumulating the plurality of slice correlation results,
wherein each of the slices is divided into a plurality of sub-slices by reading a group of S samples from a memory module L times,
wherein each group of S samples corresponds to a sub-slice, L denotes the number of sub-slices that can be processed in parallel by a correlation module, and S denotes the number of samples per chip of the received signal.

3. A method for improving correlation, the method comprising:
receiving a signal;
dividing the signal into a plurality of slices;
dividing each of the slices into a plurality of sub-slices;
generating a plurality of chips of a PN code;
generating a plurality of sub-slice correlation results in parallel;
generating a plurality of slice correlation results by summing the plurality of sub-slice correlation results; and
generating a correlation result by accumulating the plurality of slice correlation results,
wherein the plurality of chips of a PN code are generated by:
(i) selecting a PN generator;
(ii) identifying initialization values associated with the PN generator;
(iii) configuring the PN generator using the initialization values;
(iv) identifying a state A of the PN generator, wherein the state A corresponds to the state of the PN generator before the state of the PN generator is advanced by a first number of times;
(v) determining a next-value of the PN generator;
(vi) advancing the state of the PN generator the first number of times relative to the state A;
(vii) identifying a chip of the PN code and one or more subsequent chips of the PN code;
(viii) determining a state of the PN generator advanced by a second number of times relative to A; and
(ix) setting the state of the PN generator to the state A advanced by the second number of times.

4. The method of claim 3, wherein the first number of times is greater than the second number of times.

5. The method of claim 3, wherein the next-value of the PN generator is determined using a next-value function, and the PN generator is advanced by using the next-value of the PN generator.

6. One or more non-transitory machine-readable media embodying program instructions that, when executed by one or more machines, cause the one or more machines to implement a method for improving correlation, the method comprising:
receiving a signal;
dividing the signal into a plurality of slices;
dividing each of the slices into a plurality of sub-slices;
generating a plurality of chips of a PN code;
generating a plurality of sub-slice correlation results in parallel;
generating a plurality of slice correlation results by summing the plurality of sub-slice correlation results; and
generating a correlation result by accumulating the plurality of slice correlation results,
wherein the signal is divided into a plurality of slices by writing a group of L*S samples of the signal into a memory module a plurality of times,
wherein each group of L*S samples corresponds to a slice, L denotes the number of sub-slices that can be processed in parallel by a correlation module, and S denotes the number of samples per chip of the signal.

7. One or more non-transitory machine-readable media embodying program instructions that, when executed by one or more machines, cause the one or more machines to implement a method for improving correlation, the method comprising:
receiving a signal;
dividing the signal into a plurality of slices;
dividing each of the slices into a plurality of sub-slices;
generating a plurality of chips of a PN code;
generating a plurality of sub-slice correlation results in parallel;
generating a plurality of slice correlation results by summing the plurality of sub-slice correlation results; and
generating a correlation result by accumulating the plurality of slice correlation results,
wherein each of the slices is divided into a plurality of sub-slices by reading a group of S samples from a memory module L times,
wherein each group of S samples corresponds to a sub-slice, L denotes the number of sub-slices that can be processed in parallel by a correlation module, and S denotes the number of samples per chip of the received signal.

8. One or more non-transitory machine-readable media embodying program instructions that, when executed by one or more machines, cause the one or more machines to implement a method for improving correlation, the method comprising:
receiving a signal;
dividing the signal into a plurality of slices;
dividing each of the slices into a plurality of sub-slices;
generating a plurality of chips of a PN code;
generating a plurality of sub-slice correlation results in parallel;
generating a plurality of slice correlation results by summing the plurality of sub-slice correlation results; and
generating a correlation result by accumulating the plurality of slice correlation results,
wherein the plurality of chips of a PN code are generated by:
(i) selecting a PN generator;
(ii) identifying initialization values associated with the PN generator;
(iii) configuring the PN generator using the initialization values;
(iv) identifying a state A of the PN generator, wherein the state A corresponds to the state of the PN generator before the state of the PN generator is advanced by a first number of times;
(v) determining a next-value of the PN generator;
(vi) advancing the state of the PN generator the first number of times relative to the state A;
(vii) identifying a chip of the PN code and one or more subsequent chips of the PN code;
(viii) determining a state of the PN generator advanced by a second number of times relative to A; and
(ix) setting the state of the PN generator to the state A advanced by the second number of times.

9. The one or more non-transitory machine-readable media of claim 8, wherein the first number of times is greater than the second number of times.

10. The one or more non-transitory machine-readable media of claim 8, wherein the next-value of the PN generator is determined using a next-value function, and the PN generator is advanced by using the next-value of the PN generator.

\* \* \* \* \*